United States Patent
Dong et al.

(10) Patent No.: US 11,507,396 B2
(45) Date of Patent: Nov. 22, 2022

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Dazhi Dong, Shanghai (CN); Binhua Lu, Shanghai (CN); Shufang Meng, Shanghai (CN); Xing Chen, Shanghai (CN); Chen Zhang, Shanghai (CN); Tongyin Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 16/845,244

(22) Filed: Apr. 10, 2020

(65) Prior Publication Data
US 2021/0034383 A1 Feb. 4, 2021

(30) Foreign Application Priority Data

Jul. 30, 2019 (CN) .......................... 201910694910.7

(51) Int. Cl.
*G06F 9/455* (2018.01)
*G06F 9/445* (2018.01)
*G06F 11/34* (2006.01)
*G06F 11/30* (2006.01)

(52) U.S. Cl.
CPC ...... *G06F 9/44594* (2013.01); *G06F 11/3034* (2013.01); *G06F 11/3442* (2013.01)

(58) Field of Classification Search
CPC .......................... G06F 11/3034; G06F 11/3442
See application file for complete search history.

(56) References Cited

U.S. PATENT DOCUMENTS

| | | | |
|---|---|---|---|
| 8,843,724 B2 | 9/2014 | Satoyama et al. | |
| 8,949,671 B2 * | 2/2015 | Mukherjee | G06F 11/0718 714/26 |
| 9,229,652 B2 | 1/2016 | Satoyama et al. | |
| 9,740,436 B2 | 8/2017 | Fiebrich-Kandler et al. | |
| 10,101,910 B1 * | 10/2018 | Karppanen | G06F 3/0631 |
| 10,552,320 B2 | 2/2020 | Zhou et al. | |
| 10,936,494 B1 | 3/2021 | Panghal et al. | |
| 10,977,105 B2 | 4/2021 | Kao | |
| 2013/0047039 A1 * | 2/2013 | Manes | G06F 11/3466 714/47.1 |
| 2015/0150003 A1 * | 5/2015 | Emelyanov | G06F 9/455 718/1 |
| 2016/0034397 A1 * | 2/2016 | Lam | G06F 16/90335 711/119 |

(Continued)

*Primary Examiner* — Dong U Kim
(74) *Attorney, Agent, or Firm* — BainwoodHuang

(57) ABSTRACT

Techniques perform storage management. In accordance with such techniques, in response to determining that there is an abnormal process in a process group of an application, and a first size of storage space occupied by the abnormal process exceeds a first threshold, an abnormal process is terminated. A second size of storage space occupied by other processes than the abnormal process in the process group after the abnormal process is terminated is determined. In response to the second size exceeding a second threshold, at least one process in the process group to reduce the second size is terminated, where the at least one process is different from the abnormal process.

23 Claims, 7 Drawing Sheets

(56) References Cited

U.S. PATENT DOCUMENTS

2016/0036722 A1    2/2016  Obrecht et al.
2016/0070633 A1    3/2016  Abraham et al.
2017/0060465 A1*  3/2017  Branson ................ G06F 3/0653
2017/0116065 A1    4/2017  Holden et al.
2018/0129537 A1    5/2018  Kurtzman et al.
2019/0384515 A1  12/2019  Wang et al.

\* cited by examiner

METHOD, DEVICE AND COMPUTER PROGRAM PRODUCT FOR STORAGE MANAGEMENT

CROSS-REFERENCE TO RELATED APPLICATION

This application claims priority to Chinese Patent Application No. CN201910694910.7, on file at the China National Intellectual Property Administration (CNIPA), having a filing date of Jul. 30, 2019, and having "METHOD, DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to storage management systems, and particularly to a method, a device and a computer program product for storage management.

BACKGROUND

In a storage system, when a plurality of processes of an application occupy too much storage space, a certain loss to a storage device may be caused. For purpose of protecting the storage device, normally, part of the processes are terminated or canceled to reduce the loss. Generally, a computing device may obtain a total size of storage space occupied by a process group of the application, and then terminate or cancel part of the processes based on the total size of storage space occupied by the process group. However, in this manner, only loss to the storage device due to a too large size of total storage space occupied by a group of processes may be avoided, and an impact of an individual process on the storage device cannot be measured.

SUMMARY

Embodiments of the present disclosure relate to solutions for storage management.

According to a first aspect of the present disclosure, there is provided a method of storage management. The method includes: in response to determining that there is an abnormal process in a process group of an application, and a first size of storage space occupied by the abnormal process exceeds a first threshold, the abnormal process is terminated. A second size of storage space occupied by other processes than the abnormal process in the process group after the abnormal process is terminated is determined. In response to the second size exceeding a second threshold, at least one process in the process group to reduce the second size is terminated, where the at least one process is different from the abnormal process.

According to a second aspect of the present disclosure, there is provided a method of storage management. The method includes: a first size of storage space occupied by each process in a process group of an application is determined. A second size of storage space occupied by the process group is determined based on the first sizes. In response to the second size being below a second threshold, whether there is an abnormal process in the process group is determined, where the first size of storage space occupied by the abnormal process exceeds a first threshold. In response to determining that there is an abnormal process in the process group, the abnormal process is terminated.

According to a third aspect of the present disclosure, there is provided an electronic device. The device includes: at least one processor; and a memory coupled to the at least one processor and having instructions stored thereon, the instructions, when executed by the at least one processor, causing the device to perform acts, the acts including: in response to determining that there is an abnormal process in a process group of an application, and a first size of storage space occupied by the abnormal process exceeds a first threshold, terminating the abnormal process; determining a second size of storage space occupied by processes than the abnormal process in the process group after the abnormal process is terminated; and in response to the second size exceeding a second threshold, terminating at least one process in the process group to reduce the second size, the at least one process being different from the abnormal process.

According to a fourth aspect of the present disclosure, there is provided an electronic device. The device includes: at least one processor; and a memory coupled to the at least one processor and including instructions stored thereon, the instructions, when executed by the at least one processor, causing the device to perform acts, the acts including: determining a first size of storage space occupied by each process in a process group of an application; determining, based on the first sizes, a second size of storage space occupied by the process group; in response to the second size being below a second threshold, determining whether there is an abnormal process in the process group, the first size of storage space occupied by the abnormal process exceeding a first threshold; and in response to determining that there is an abnormal process in the process group, terminating the abnormal process.

According to a fifth aspect of the present disclosure, there is provided a computer program product that is tangibly stored in a non-transitory computer-readable medium and includes machine-executable instructions. The machine-executable instructions, when executed, cause a machine to perform steps of the method according to the first aspect of the present disclosure.

According to a sixth aspect of the present disclosure, there is provided a computer program product that is tangibly stored in a non-transitory computer readable medium and includes machine-executable instructions. The machine-executable instructions, when executed, cause a machine to perform steps of the method according to the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings. In the figures, several embodiments of the present disclosure are shown by way of example and in a non-restrictive manner, wherein.

Throughout the drawings, the same or like reference numerals are used to denote the same or like components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, various example embodiments of the present disclosure will be described in detail with reference to the accompanying drawings. It should be noted that what are involved by these figures and depictions are only example embodiments. It should be appreciated that according to subsequent depictions, alternative embodiments of structures and methods disclosed here may be readily envisaged, and may be used without departing from the principles as defined by the present disclosure.

It should be appreciated that these example embodiments are presented only to enable those skilled in the art to better understand and thereby implement the present disclosure, rather than limiting the scope of the present disclosure in any manner.

As used herein, the term "includes" and its variants are to be read as open-ended terms that mean "includes, but is not limited to." The term "based on" is to be read as "based at least in part on." The term "one embodiment" and "the embodiment" are to be read as "at least one embodiment." Relevant definitions of other terms will be given in the following depictions.

Figure 1:
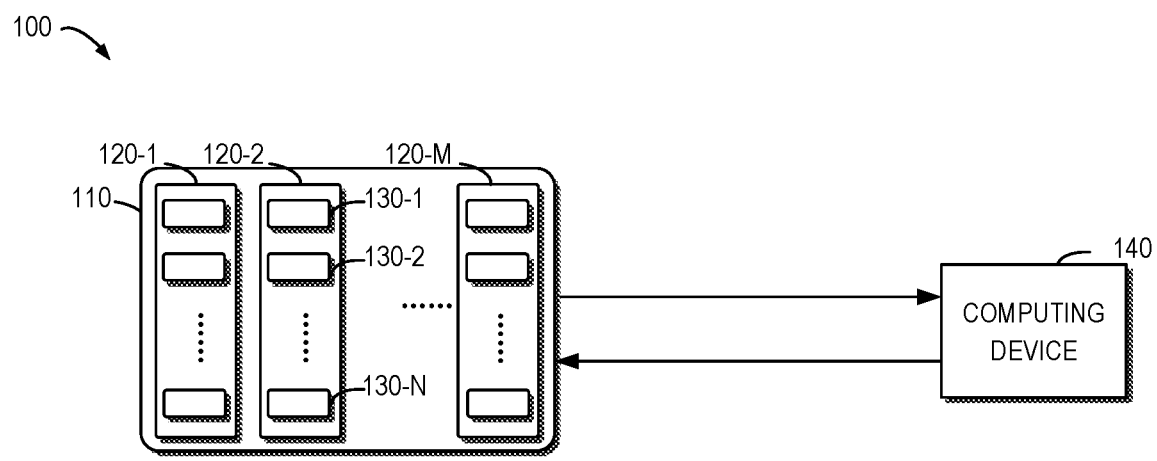
FIG. 1 illustrates a schematic diagram of an example system according to the present disclosure.

FIG. 1 illustrates a schematic diagram of an example system according to the present disclosure. As shown in FIG. 1, the system 100 includes an application 110, a plurality of process groups 120-1, 120-2, . . . 120-M of the application 110 and a computing device 140. Taking the process group 120-2 as an example, the process group includes a plurality of processes 130-1, 130-2, . . . 130-N.

In some embodiments, the computing device 140 may for example include any type of mobile terminal, stationary terminal or portable terminal, including mobile handsets, multimedia computers, multimedia tablets, Internet nodes, communicators, desktop computers, laptop computers, notebook computer, netbook computer, tablet computer, personal communication system (PCS) device, personal navigation device, personal digital assistant (PDA), audio/video player, digital camera/video camera, positioning device, television receiver, radio broadcast receiver, e-book devices, gaming devices, or any combinations thereof, including accessories and peripherals for these devices, or any combinations thereof. It may also be foreseen that the computing device 140 may support any type of interface for the user (such as "wearable" circuitry, etc.).

It should be appreciated that FIG. 1 only schematically illustrates devices or components in the system 100 that are related to embodiments of the present disclosure. Embodiments of the present disclosure are not limited to the specific devices or components depicted in FIG. 1, but are generally applicable to any data backup system based on a cloud service platform.

Traditionally, in order to reduce a loss to storage device, the computing device 140 generally obtains sizes of storage space occupied by a plurality of process groups 120-1, 120-2 . . . 120-M respectively from the application 110, where M is an integer greater than one. The sizes are compared with a threshold to determine a process group which occupies a size of the storage space exceeding the threshold. Taking the process group 120-2 as an example, the computing device 140 selects a certain number of processes from a plurality of processes 130-1, 130-2 . . . 130-N in the process group 120-2 to terminate or cancel the processes, where N is an integer greater than 1.

However, as stated above, this solution fails to measure an impact of an individual process in the process group 120-2 on the storage device. For example, a total size of the storage space occupied by the process group 120-2 may not exceed the threshold, that is, within a reasonable range. However, part of the plurality of processes 130-1, 130-2 . . . 130-N in the process group 120-2, for example the processes 130-1 and 130-2, occupy too large storage space. This means that the two processes still cause loss to the storage device. Only considering the size of the storage space occupied by the process group cannot solve the problem raised in the above case.

Therefore, the present disclosure proposes a solution for storage management. In the solution, an impact of storage space occupied by an individual process along with the storage space occupied by the process group on the storage device is considered, thereby preventing a plurality of processes of the application 110 from causing loss to the storage device of the system.

Figure 2:
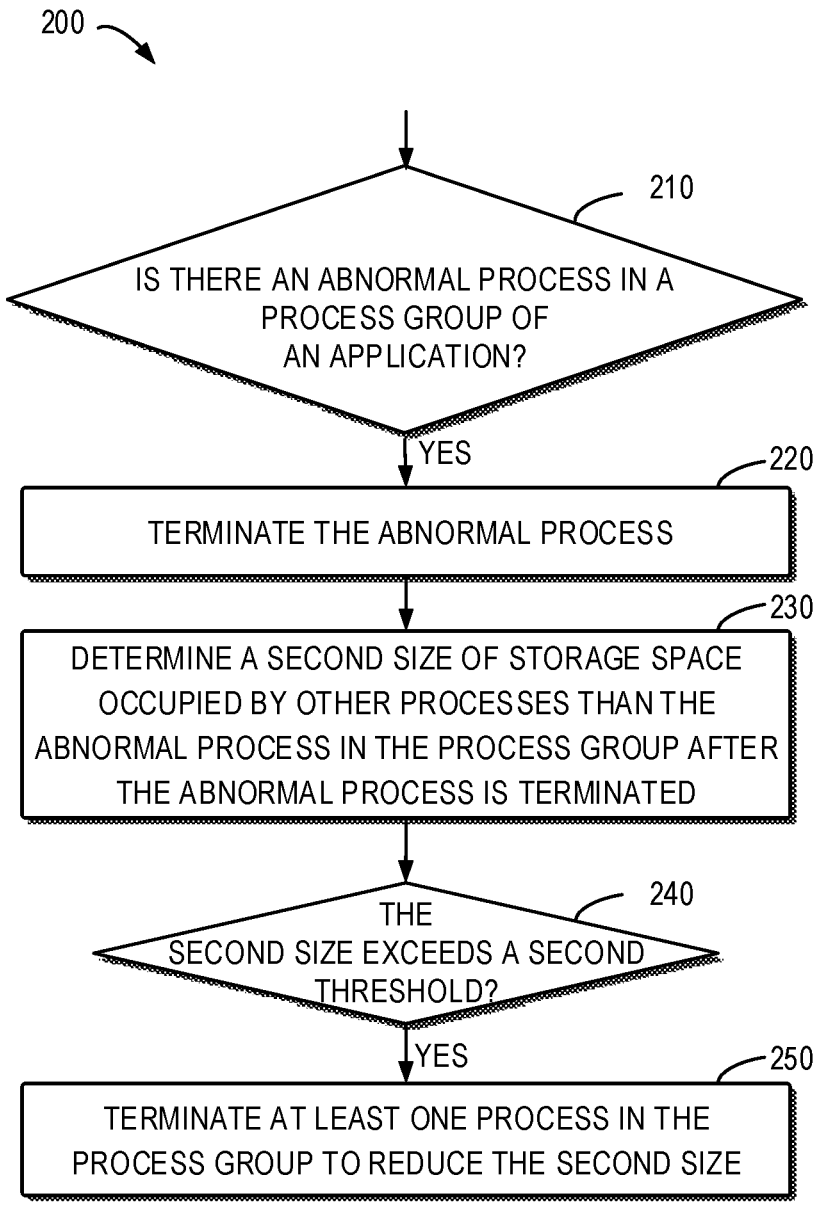
FIG. 2 illustrates a schematic diagram of a method according to an embodiment of the present disclosure.

A method according to an embodiment of the present disclosure will be described in further detail below with reference to FIG. 2 through FIG. 6. FIG. 2 illustrates a schematic diagram of a method 200 according to an embodiment of the present disclosure. The method illustrated in FIG. 2 can be applied for the example system depicted in FIG. 1. For example, the method 200 may be performed by the computing device 140 of FIG. 1 or other suitable devices. For purpose of description, reference numerals consistent with FIG. 1 are used in FIG. 2 for the same or like components.

At block 210, the computing device 140 determines whether there is an abnormal process in the process group 120-2 of the application 110. The abnormal process refers to a process in the process group 120, a first size of storage space occupied by which exceeds a first threshold.

Figure 3:
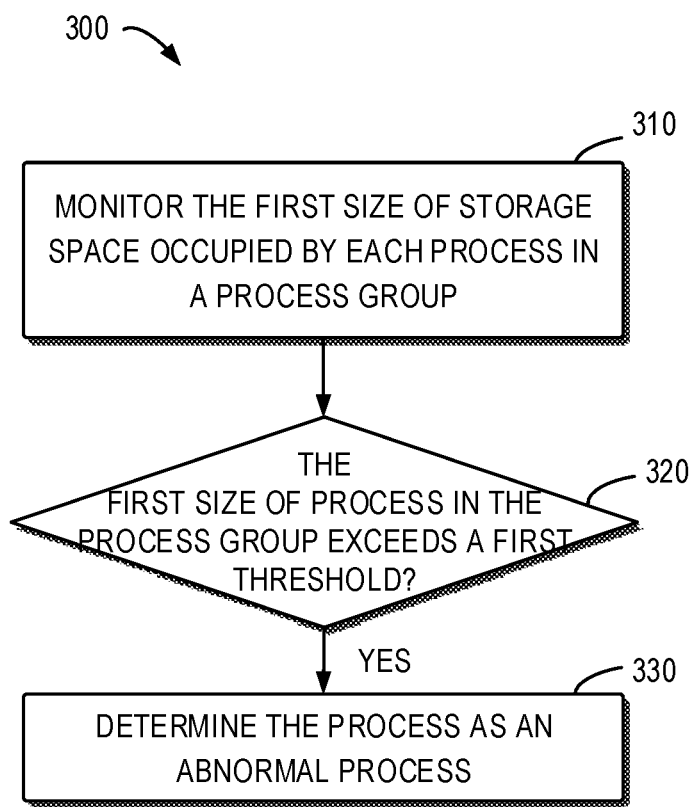
FIG. 3 illustrates a flow chart of a method of determining an abnormal process according to an embodiment of the present disclosure.

To measure an impact of an individual process in the process group on the storage device, the computing device 140 determines there is an abnormal process in the plurality of processes 130-1, 130-2 . . . 130-N in the process group 120-2. According to an embodiment of the present disclosure, an abnormal process may be determined in various ways. For example, whether a process is an abnormal process may be determined by checking whether a first size of storage space occupied by a process exceeds the first threshold. FIG. 3 illustrates a flow chart of a method 300 of determining an abnormal process according to an embodiment of the present disclosure.

At block 310, the computing device 140 monitors a first size of storage space occupied by each of the processes 130-1, 130-2 . . . 130-N in the process group 120-2. In some embodiments, the computing device 140 has a monitoring function which is capable of detecting the first size of storage space occupied by each of the processes 130-1, 130-2 . . . 130-N in real time.

At block 320, the computing device 140 determines whether the first size of one process in the process group 120-2 exceeds the first threshold. In some embodiments, the first threshold is a predetermined maximum value of storage space to be occupied by an individual process. The first size exceeding the first threshold means that the individual process will cause damage to the storage device, and the first size not exceeding the first threshold means that the individual process won't cause damage to the storage device.

If the first size of one process in the process group 120-2 exceeds the first threshold, the computing device 140 determines the process as an abnormal process at block 330. In some embodiments, when a first size of a certain process in the process group 120-2 (e.g., process 130-1) exceeds the first threshold, the process 130-1 is determined as an abnormal process. This means that process 130-1 may cause loss to the storage device in the system because it occupies excessive storage space.

Returning to FIG. 2, if it is determined that there is an abnormal process 130-1 in the process group 120-2 of the application 110; the computing device 140 terminates the abnormal process 130-1 at block 220. In some embodiments, once the computing device 140 detects the abnormal process 130-1, it terminates the process in time to avoid further loss to the storage device.

Figure 4:
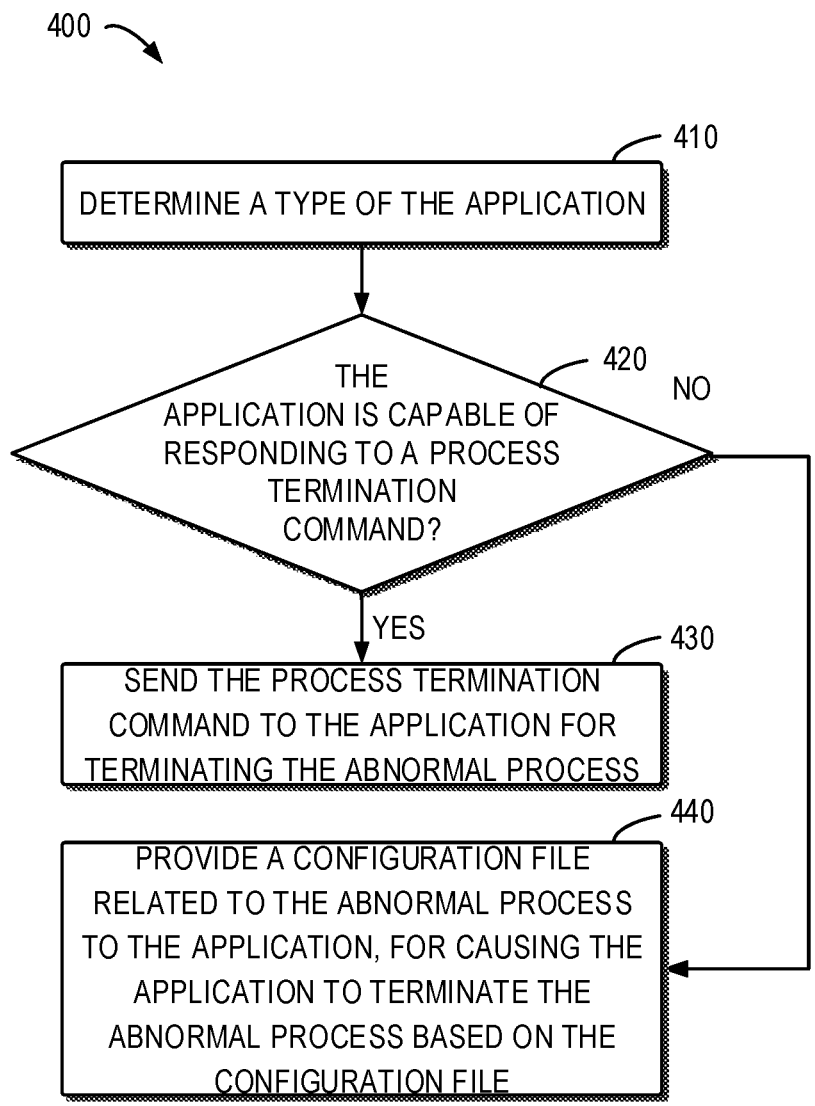
FIG. 4 illustrates a flow chart of a method of terminating an abnormal process according to an embodiment of the present disclosure.

The abnormal process may be terminated in a number of manners. FIG. 4 illustrates a flow chart of a method of terminating an abnormal process according to an embodiment of the present disclosure.

As shown in FIG. 4, upon terminating execution of the abnormal process 130-1, the computing device 140 first determines, at block 410, the type of the application 110. In some embodiments, during performing a task of termination of the abnormal process 130-1, the computing device 140 sends a process termination command to the application 110, where the process termination command is used to terminate the abnormal process 130-1. In some embodiments, the process termination command includes a specified process to be terminated, such as the process 130-1.

In some embodiments, the application 110 can respond normally to the process termination command, i.e., the application 110 can terminate the to-be-terminated process specified in the command. While, in other embodiments, the application 110 cannot respond normally to the process termination command. For example, after receiving the command, some applications won't terminate the specified process, but terminate all processes in the application. Although processing a process termination command in such manner can terminate the abnormal process 130-1, unnecessary termination of other processes and unnecessary loss to data in the other processes are caused, thereby bringing many unnecessary troubles to subsequent data backup and rebuilding. Therefore, it is necessary to, for different types of applications 110, adopt different approaches only terminate the abnormal process 130-1 for avoiding unnecessary process termination.

In some embodiments, the computing device 140 may determine the type of application by extracting a name of application 110. For example, a list of a plurality of applications that can/cannot respond normally to the process termination command is stored in the computing device. The extracted name of the application 110 may be compared to matches the processes in the list, such that the type of application 110 is determined. The above manner of determining the type is only an example, and any other manners capable of determining the type of the application 110 may be employed.

At block 420, after the type of application 110 is determined, it is determined whether the type of the application 110 indicates the application is capable of responding to the process termination command. If the application 110 is capable of terminating the abnormal process specified in the command in response to the process termination command, the computing device 140 sends a process termination command of terminating the abnormal process 130-1 to the application 110 at block 430 to trigger a process-terminating procedure, and reduce the loss to the storage system by the abnormal process in time.

If the application 110 is incapable of terminating the abnormal process specified in the command in response to the process termination command, the computing device 140 sends a configuration file related to the abnormal process 130-1 to the application 110 at block 440. In some embodiments, the configuration file is used to enable the application 110 to terminate the abnormal process 130-1 based on the configuration file, with respect to a process 110 incapable of terminating the specified abnormal process 130-1 in response to the process termination command. In some embodiments, the configuration file includes, but not limited to, a user-defined script file, a built-in file that that is carried by the application 110 and used to terminate the specified process, and so on.

Through the method 400, the computing device 140 can send, according to the type of the application 110, a process termination command/configuration file that corresponds to the type of the application 110 and is used to terminate the abnormal process 130-1, to achieve avoidance of unnecessary termination of other processes and prevent unnecessary loss and rebuild of data while implementing the termination of the abnormal process.

The computing device 140 terminates the determined abnormal process 130-1 in time, thereby eliminating the loss caused by an individual process to the storage device, and ensuring that remaining processes in the process group do not affect the performance of the storage device due to occupation of excessive storage space.

The above process eliminates potential impact of an individual process on storage device; next, thoughts will be given to impact of a total size of storage space occupied by other processes in the process group 120-2 on the storage device, after the abnormal process 130-1 is terminated.

Referring back to FIG. 2, at block 230, the computing device 140 determines a second size of storage space occupied by other processes than the abnormal process 130-1 in the process group 120-2 after abnormal process 130-1 is terminated, where the second size is the total size of storage space occupied by other processes. In some embodiments, the first size of each of the other processes may be summated to obtain the second size based on the first size of each of the other processes previously determined.

At block 240, the computing device 140 determines whether the second size exceeds a second threshold, where the second threshold is a maximum value of the total size of the storage space occupied by process group 120-2. The second size exceeding the second threshold means that the process group 120-2 will cause damage to the storage device, and the second size not exceeding the second threshold means that the process group 120-2 won't cause damage to the storage device.

At block 250, when the second size exceeds the second threshold, at least one process in the process group 120-2 is terminated to reduce the second size, the at least one process being different from the abnormal process. By reducing the second size, it is known that the second size does not exceed the second threshold, thereby eliminating the impact of the process group 120-2 on the storage device of the system.

In some embodiments, the process by which the computing device 140 terminates at least one of the other processes may terminate at least one process in the process group 120-2 in the application 110 according to the process illustrated by the method 400.

Figure 5:
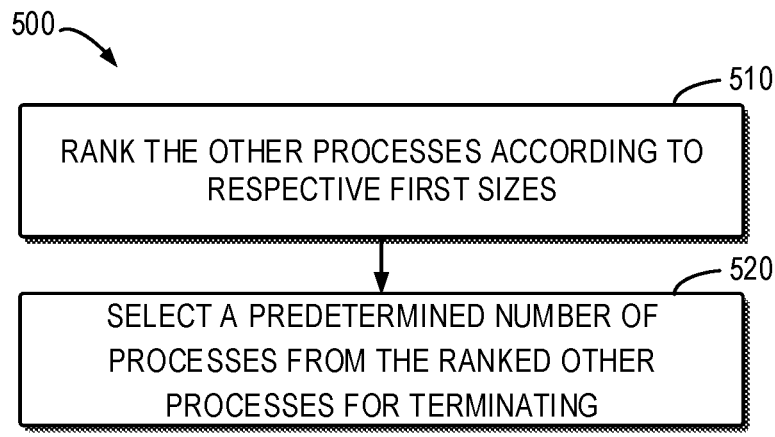
FIG. 5 illustrates a flow chart of a method of terminating at least one process that is in a process group and different from an abnormal process according to an embodiment of the present disclosure.

FIG. 5 illustrates a flow chart of a method of terminating at least one process in a process group according to an embodiment of the present disclosure, where the at least one process is different from an abnormal process.

As shown in FIG. 5, at block 510, the computing device 140 ranks other processes according to respective first sizes. In some embodiments, at least one process to be terminated in the other processes may be determined based on a ranking result. The above ranking-based strategy is merely an example, and any strategy that can determine at least one process to be terminated from other processes can be employed.

At block 520, a predetermined number of processes are selected from the other ranked processes for termination. In some embodiments, a process ranking top according to the ranking result and having a larger first size may be selected for termination, thereby reducing the second size until the second size does not exceed the second threshold. This can avoid the loss caused by the process group 120-2 as a whole to the storage device.

Returning to FIG. 2, in this manner, the method 200 enables consideration of impact of a plurality of processes of the application 110 on the storage device from two aspects, namely, an individual process and a process group. It is possible to avoid the loss caused by an individual process to a storage device while avoiding the loss caused by a total size of storage space occupied by a process group to the storage device.

In some embodiments, the method of determining the first threshold and the second threshold may be predetermined based on a platform where the application 110 is located. For example, it is feasible to determine the platform where the application 110 is located, and extract configuration parameters related to the platform, and determine the first threshold and the second threshold of the platform therefrom.

Usually, the first thresholds and second thresholds of different platforms may be different. The above method of determining the first threshold and the second threshold is merely an example, and any other method capable of determining the first threshold and the second threshold of the application may be employed.

Figure 6:
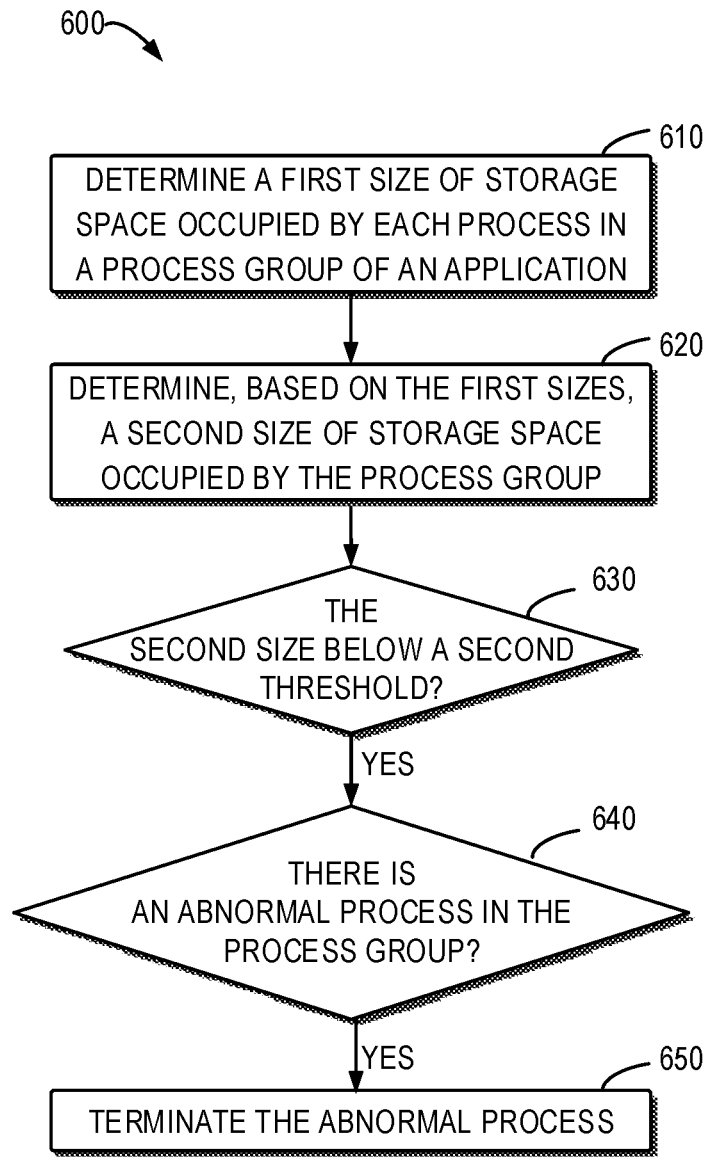
FIG. 6 shows a schematic diagram of a method according to an embodiment of the present disclosure.

FIG. 6 shows a schematic diagram of a method 600 according to an embodiment of the present disclosure. The method 600 considers an impact of a size of storage space occupied by an individual process on the storage device in the case that a total size of the storage space occupied by the process group 120-2 does not have any impact on the storage device.

In FIG. 6, at block 610, taking the process group 120-2 as an example, the computing device 140 determines a first size of the storage space occupied by each of processes 130-1, 130-2 . . . 130-N in the process group 120-2 of the application 110. In some embodiments, the computing device 140 may have a monitoring function. The computing device 140 may determine the first size by monitoring each of processes 130-1, 130-2 . . . 130-N in the process group 120-2 in real time.

At block 620, based on the first sizes, the computing device 140 determines a second size of storage space occupied by the process group 120-2. In some embodiments, the second size may be determined through obtaining the second size by summating the first size of each of the respective processes 130-1, 130-2 . . . 130-N, based on the determined first size of each of the respective processes 130-1, 130-2 . . . 130-N.

At block 630, the computing device 140 determines whether the second size is below a second threshold. The second threshold is a maximum value of the total size of the storage space occupied by the process group 120-2. The second size exceeding the second threshold means that the process group 120-2 will cause damages to the storage device, and the second size being below the second threshold means that the process group 120-2 will not cause damages to the storage device.

Upon it is determined that the second size is below the second threshold, this means that the total size of the storage space occupied by the process group 120-2 as a whole does not cause loss to the storage device. At this time, the computing device 140 further considers an impact of an individual process in the process group 120-2 on the storage device.

At block 640, the computing device 140 determines whether there is an abnormal process in the process group 120-2. In some embodiments, the abnormal process refers to a process which is in the process group 120 and occupies the first size of storage space exceeding the first threshold; that is, in response to the first size of the process 130-1 exceeding the first threshold, a process 130-1 in the process group 120-2 is determined as an abnormal process.

In some embodiments, the abnormal process in the process group 120-2 may be determined by the method 300 of determining the abnormal process according to an embodiment of the present disclosure.

If it is determined that there is an abnormal process in the process group 120-2, then at block 650, the computing device 140 terminates the determined abnormal process. In some embodiments, the abnormal process in the process group 120-2 may be determined by the method 400 of terminating an abnormal process according to an embodiment of the present disclosure.

In this manner, the method 600 considers the impact of an individual process within the process group 120-2 on the storage device in the case where the total size of the storage space occupied by the process group 120-2 does not exceed a threshold. When at least one of the processes 130-1, 130-2 . . . 130-N in the process group 120-2 is an abnormal process, the computing device will terminate the abnormal process in time. The problem solved by the method 600 is that a current solution for protecting a storage device only covers a total size of storage space occupied by a process group, and cannot provide a solution to the case where the process group as a whole does not cause loss to the storage device whereas an individual process in the process group causes loss to the storage device.

Figure 7:
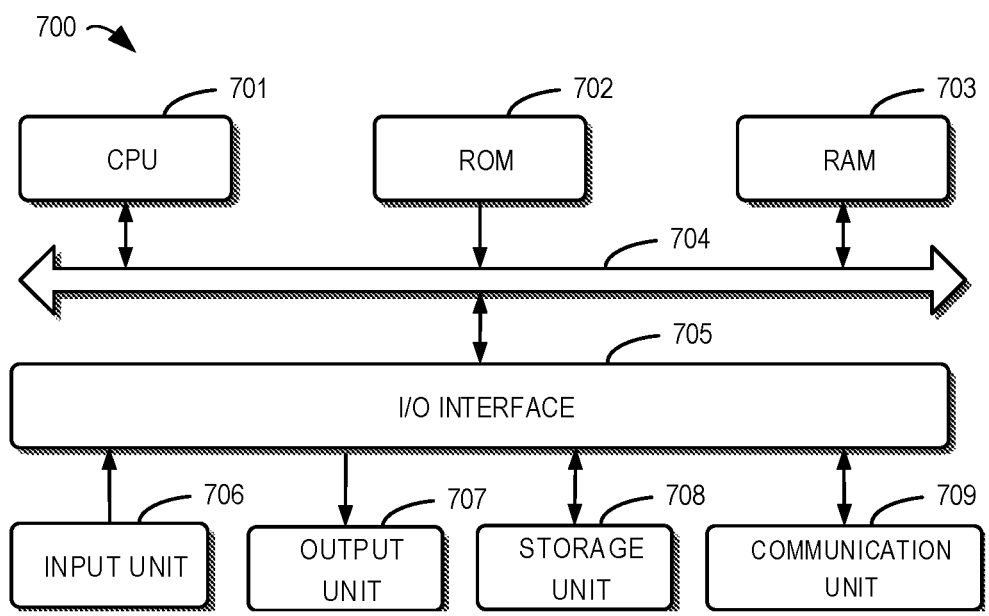
FIG. 7 shows a schematic block diagram of an electronic device that can be used to implement embodiments of the present disclosure.

FIG. 7 illustrates a schematic block diagram of an example device 700 that may be used to implement embodiments of the present disclosure. As shown in the figure, the device 700 includes a central processing unit (CPU) 701 which is capable of performing various processes in accordance with computer program instructions stored in a read only memory (ROM) 702 or computer program instructions loaded from a storage unit 708 to a random access memory (RAM) 703. In the RAM 703, various programs and data as required by operation of the device 700 may also be stored. The CPU 701, the ROM 702 and the RAM 703 are connected to one another via a bus 704. An input/output (I/O) interface 705 is also connected to the bus 704.

The following components in the device 700 are connected to the I/O interface 705: an input unit 706 including a keyboard, a mouse, or the like; an output unit 707 such as various types of displays and speakers; a storage unit 708 such as a magnetic disk or optical disk; and a communication unit 709 such as a network card, a modem, a wireless communication transceiver or the like. The communication unit 709 allows the device 700 to exchange information/data with other devices via a computer network such as the Internet and/or various telecommunication networks.

The processing unit 701 performs various methods and processes described above, for example methods 200, 300, 400, 500 and 600. For example, in some embodiments, the methods 300 and 400 may be implemented as a computer software program, which is tangibly contained in a machine-readable medium, for example the storage unit 708. In some embodiments, part or the entire computer program may be loaded and/or installed on the device 700 via the ROM 702 and/or communication unit 709. When the computer program is loaded in the RAM 703 and executed by the CPU 701, one or more acts of the methods 200, 300, 400, 500 and 600 described above may be executed.

The present disclosure may be a method, device, system and/or computer program product. The computer program product may include a computer readable medium on which computer readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, special purpose computer, or other programmable data processing apparatus to produce a machine, such that the instructions, which execute via the processing unit of the computer or other programmable data processing apparatus, create means (e.g., specialized circuitry) for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of storage management, comprising:
   in response to determining that there is an abnormal process in a process group of an application due to a first size of storage space occupied by the abnormal process exceeding a first threshold, terminating the abnormal process;
   determining a second size of storage space occupied by processes other than the abnormal process in the process group after the abnormal process is terminated; and
   in response to the second size exceeding a second threshold, terminating at least one process in the process group to reduce the second size, each process in the at least one process being a different process from the abnormal process;
   wherein the method is performed within a storage system;
   wherein the first threshold is a predetermined individual process threshold that identifies a maximum value of storage space that an individual process of the process group is permitted to occupy within the storage system; and
   wherein terminating the abnormal process includes:
      terminating, as the abnormal process, a particular process of the process group that occupies an amount of storage space that exceeds the predetermined individual process threshold.

2. The method according to claim 1, wherein the first threshold and the second threshold are pre-configured based on a platform in which the application is located.

3. The method according to claim 1, further comprising:
   monitoring a set of first sizes of storage space including a respective first size occupied by each process in the process group;
   in response to a first size in the set of first sizes exceeding the first threshold, determining a respective process as the abnormal process.

4. The method according to claim 1, wherein terminating the abnormal process comprises:
   determining a type of the application;
   in response to the type indicating that the application is capable of responding to a process termination command, sending the process termination command to the application for terminating the abnormal process; and
   in response to the type indicating that the application is not capable of responding to the process termination command, providing a configuration file related to the abnormal process to the application, for causing the application to terminate the abnormal process based on the configuration file.

5. The method according to claim 1, wherein determining the second size comprises:
   determining a sum of respective first sizes of the processes other than the abnormal process in the process group as the second size.

6. The method according to claim 1, wherein terminating the at least one process comprises:
   ranking the processes other than the abnormal process in the process group according to a respective first size of storage space occupied by each of the processes other than the abnormal process in the process group; and
   selecting a predetermined number of processes from the ranked processes for terminating.

7. The method of claim 1, further comprising
   in response to determining that there is a second abnormal process in a second process group of the application due to a second size of storage space occupied by the second abnormal process exceeding the first threshold, terminating the second abnormal process;
   determining a particular size of storage space occupied by processes other than the second abnormal process in the second process group after the second abnormal process is terminated; and
   in response to the particular size exceeding the second threshold, terminating at least one process in the second process group to reduce the particular size.

8. A method of storage management, comprising:
   determining a set of first sizes of storage space including a respective first size occupied by each process in a process group of an application;

determining, based on the set of first sizes, a second size of storage space occupied by the process group;

in response to the second size being below a second threshold, determining whether a particular process in the process group is an abnormal process due to the respective first size of storage space occupied by the abnormal process exceeding a first threshold; and in response to determining that the particular process is an abnormal process, terminating the abnormal process;

wherein the method is performed within a storage system;

wherein the first threshold is a predetermined individual process threshold that identifies a maximum value of storage space that an individual process of the process group is permitted to occupy within the storage system; and wherein terminating the abnormal process includes:
terminating, as the abnormal process, a particular process of the process group that occupies an amount of storage space that exceeds the predetermined individual process threshold.

9. The method according to claim 8, wherein the first threshold and the second threshold are pre-configured based on a platform where the application is located.

10. The method according to claim 8, wherein determining whether a particular process in the process group is an abnormal process comprises:
in response to a first size in the set of first sizes exceeding the first threshold, determining a respective process as the abnormal process.

11. The method according to claim 8, wherein terminating the abnormal process comprises:
determining a type of the application;
in response to the type indicating that the application is capable of responding to a process termination command, sending the process termination command to the application for terminating the abnormal process; and
in response to the type indicating that the application is not capable of responding to the process termination command, providing a configuration file related to the abnormal process to the application, for causing the application to terminate the abnormal process based on the configuration file.

12. An electronic device, comprising:
at least one processor; and
a memory coupled to the at least one processor and having instructions stored thereon, the instructions, when executed by the at least one processor, causing the device to perform acts, the acts comprising:
in response to determining that there is an abnormal process in a process group of an application due to a first size of storage space occupied by the abnormal process exceeding a first threshold, terminating the abnormal process;
determining a second size of storage space occupied by processes other than the abnormal process in the process group after the abnormal process is terminated; and
in response to the second size exceeding a second threshold, terminating at least one process in the process group to reduce the second size, each process in the at least one process being a different process from the abnormal process;

wherein the acts are performed within a storage system;

wherein the first threshold is a predetermined individual process threshold that identifies a maximum value of storage space that an individual process of the process group is permitted to occupy within the storage system; and wherein terminating the abnormal process includes:
terminating, as the abnormal process, a particular process of the process group that occupies an amount of storage space that exceeds the predetermined individual process threshold.

13. The device according to claim 12, wherein the first threshold and the second threshold are pre-configured based on a platform in which the application is located.

14. The device according to claim 12, the acts further comprising:
monitoring a set of first sizes of storage space including a respective first size occupied by each process in the process group;
in response to a first size in the set of first sizes exceeding the first threshold, determining a respective process as the abnormal process.

15. The device according to claim 12, wherein terminating the abnormal process comprises:
determining a type of the application;
in response to the type indicating that the application is capable of responding to a process termination command, sending the process termination command to the application for terminating the abnormal process; and
in response to the type indicating that the application is not capable of responding to the process termination command, providing a configuration file related to the abnormal process to the application, for causing the application to terminate the abnormal process based on the configuration file.

16. The device according to claim 12, wherein determining the second size comprises:
determining a sum of respective first sizes of the processes other than the abnormal process in the process group as the second size.

17. The device according to claim 12, wherein terminating the at least one process comprises:
ranking the processes other than the abnormal process in the process group according to a respective first size of storage space occupied by each of the processes other than the abnormal process in the process group; and
selecting a predetermined number of processes from the ranked processes for terminating.

18. An electronic device, comprising:
at least one processor; and
a memory coupled to the at least one processor and including instructions stored thereon, the instructions, when executed by the at least one processor, causing the device to perform acts, the acts comprising:
determining a set of first sizes of storage space including a respective first size occupied by each process in a process group of an application;
determining, based on the set of first sizes, a second size of storage space occupied by the process group;
in response to the second size being below a second threshold, determining whether a particular process in the process group is an abnormal process due to the respective first size of storage space occupied by the abnormal process exceeding a first threshold; and
in response to determining that the particular process is an abnormal process, terminating the abnormal process;

wherein the acts are performed within a storage system;

wherein the first threshold is a predetermined individual process threshold that identifies a maximum value of storage space that an individual process of the process group is permitted to occupy within the storage system; and wherein terminating the abnormal process includes:
terminating, as the abnormal process, a particular process of the process group that occupies an amount of storage space that exceeds the predetermined individual process threshold.

19. The device according to claim 18, wherein the first threshold and the second threshold are pre-configured based on a platform where the application is located.

20. The device according to claim 18, wherein determining whether a particular process in the process group is an abnormal process comprises:
in response to a first size in the set of first sizes exceeding the first threshold, determining a respective process as the abnormal process.

21. The device according to claim 18, wherein terminating the abnormal process comprises:
determining a type of the application;
in response to the type indicating that the application is capable of responding to a process termination command, sending the process termination command to the application for terminating the abnormal process; and
in response to the type indicating that the application is not capable of responding to the process termination command, providing a configuration file related to the abnormal process to the application, for causing the application to terminate the abnormal process based on the configuration file.

22. A computer program product having a non-transitory computer readable medium which stores a set of instructions to perform storage management; the set of instructions, when carried out by computerized circuitry, causing the computerized circuitry to perform a method of:
in response to determining that there is an abnormal process in a process group of an application due to a first size of storage space occupied by the abnormal process exceeding a first threshold, terminating the abnormal process;
determining a second size of storage space occupied by processes other than the abnormal process in the process group after the abnormal process is terminated; and
in response to the second size exceeding a second threshold, terminating at least one process in the process group to reduce the second size, each process in the at least one process being a different process from the abnormal process;
wherein the method is performed within a storage system;
wherein the first threshold is a predetermined individual process threshold that identifies a maximum value of storage space that an individual process of the process group is permitted to occupy within the storage system; and
wherein terminating the abnormal process includes;
terminating, as the abnormal process, a particular process of the process group that occupies an amount of storage space that exceeds the predetermined individual process threshold.

23. A computer program product having a non-transitory computer readable medium which stores a set of instructions to perform storage management; the set of instructions, when carried out by computerized circuitry, causing the computerized circuitry to perform a method of:
determining a set of first sizes of storage space including a respective first size occupied by each process in a process group of an application;
determining, based on the set of first sizes, a second size of storage space occupied by the process group;
in response to the second size being below a second threshold, determining whether a particular process in the process group is an abnormal process due to the respective first size of storage space occupied by the abnormal process exceeding a first threshold; and
in response to determining that the particular process is an abnormal process, terminating the abnormal process;
wherein the method is performed within a storage system;
wherein the first threshold is a predetermined individual process threshold that identifies a maximum value of storage space that an individual process of the process group is permitted to occupy within the storage system; and
wherein terminating the abnormal process includes:
terminating, as the abnormal process, a particular process of the process group that occupies an amount of storage space that exceeds the predetermined individual process threshold.

* * * * *